United States Patent [19]
Meis et al.

[11] 4,011,990
[45] Mar. 15, 1977

[54] CENTER PIVOT IRRIGATION SYSTEM

[75] Inventors: Charles H. Meis, Genoa; David A. Siekmeier, Columbus; Arthur L. Zimmerer, Lindsay, all of Nebr.

[73] Assignee: Lindsay Manufacturing Company, Lindsay, Nebr.

[22] Filed: Mar. 24, 1976

[21] Appl. No.: 669,918

[52] U.S. Cl. .................................. 239/11; 239/177; 239/DIG. 1; 137/344

[51] Int. Cl.² .......................................... B05B 3/12

[58] Field of Search ............... 239/177, DIG. 1, 11, 239/212; 137/344

[56] References Cited

UNITED STATES PATENTS

| | | | |
|---|---|---|---|
| 2,769,547 | 11/1956 | Hirsch | 239/177 X |
| 3,352,493 | 11/1967 | Curtis | 239/177 |
| 3,628,729 | 12/1971 | Thomas | 239/177 |
| 3,750,953 | 8/1973 | Reinke | 239/177 |
| 3,797,517 | 3/1974 | Kircher et al. | 137/344 |
| 3,902,668 | 9/1975 | Dougherty et al. | 239/177 |
| 3,921,908 | 11/1975 | Zimmerer | 239/177 |

Primary Examiner—Robert S. Ward, Jr.
Attorney, Agent, or Firm—Kinzer, Plyer, Dorn & McEachran

[57] ABSTRACT

A center pivot irrigation system and a method of operating it whereby noncircular areas outside of the circle described by the center pivot, for example the corners of a square field, may be irrigated. An extension is connected to the outermost tower of the main pipeline by an offset so that sprinkler units on the extension may be operated to irrigate the corners of the field when the extension is rotated.

32 Claims, 8 Drawing Figures

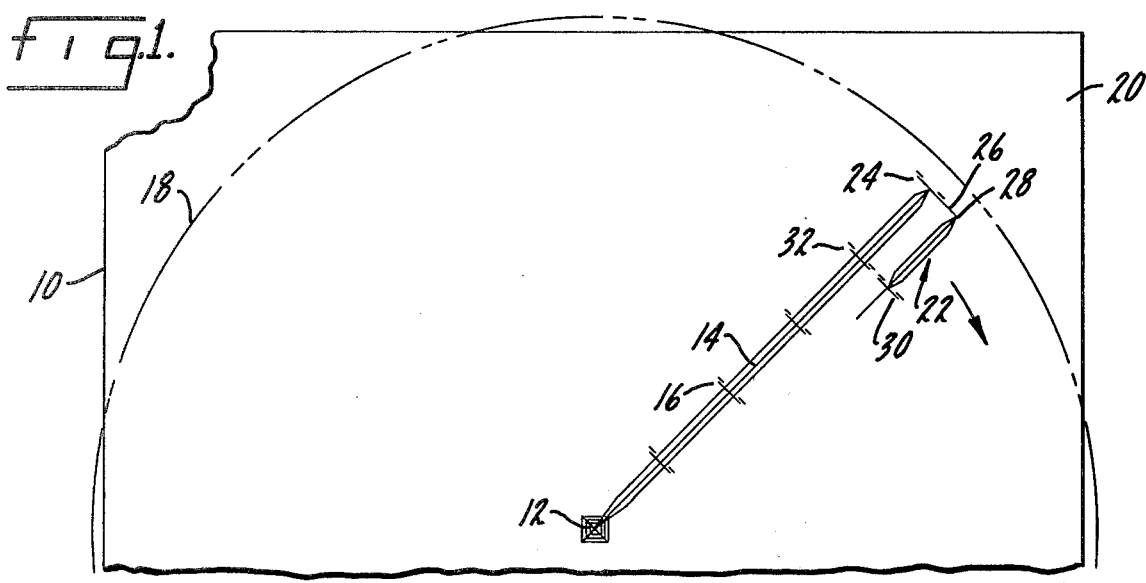
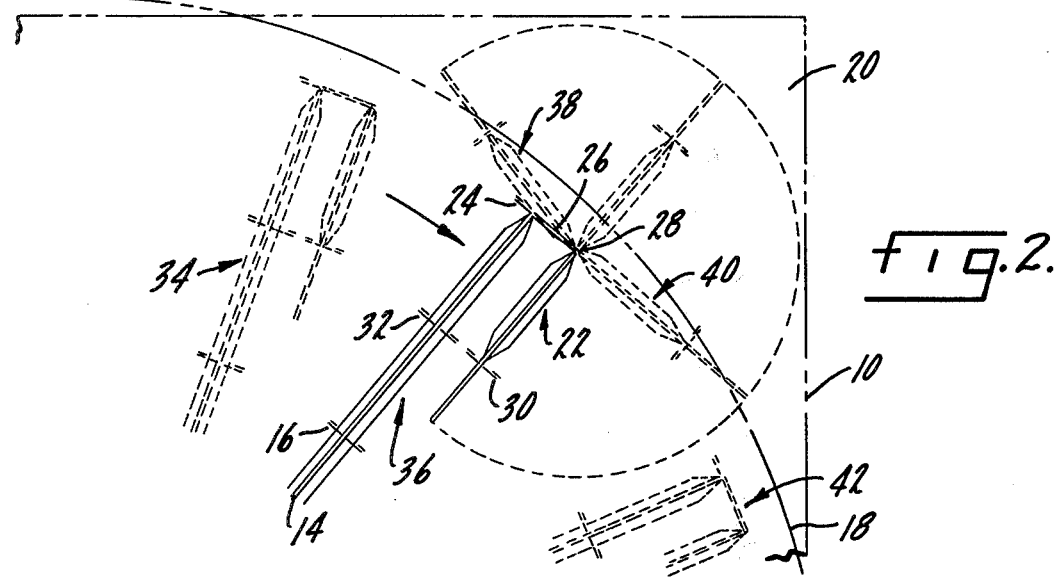
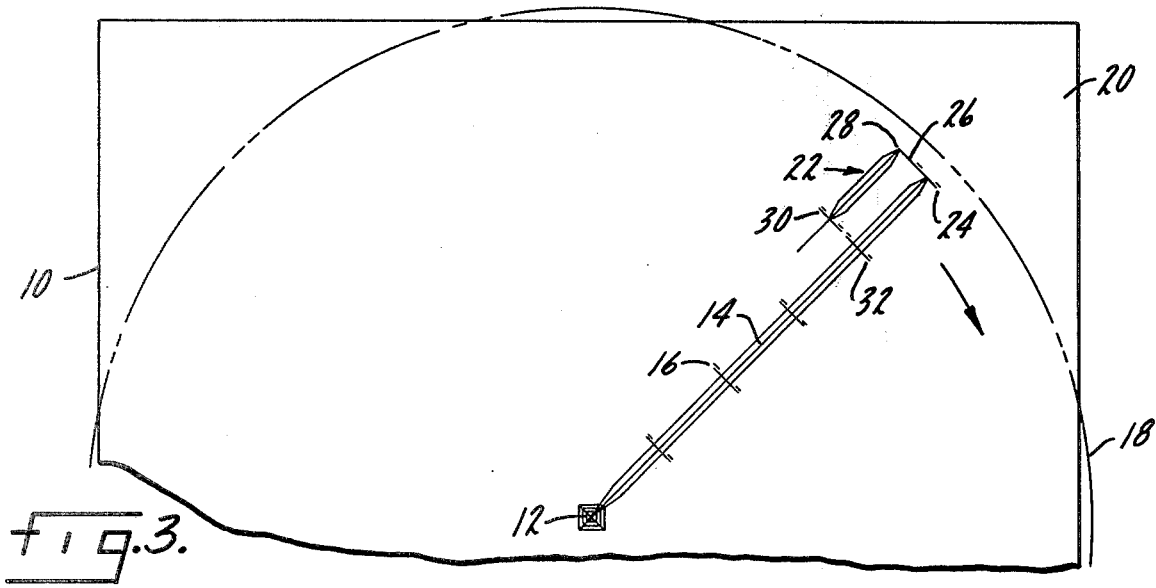

CENTER PIVOT IRRIGATION SYSTEM

SUMMARY OF THE INVENTION

This is concerned with a center pivot irrigation system which is specifically constructed to water the corners of a square field. It might be more accurate to say that it is concerned with watering or irrigating the noncircular areas outside of the circular area normally covered by the center pivot system and the noncircular areas normally take the form of the corners of a square field.

A primary object of the invention is an extension or auxiliary pipeline on the end of a center pivot irrigation system which greatly reduces safety problems.

Another object is a system of the above type which is greatly simplified over the prior art.

Another object is a system of the above type and a method of operating it which does not require that the extension have steerable wheels.

Another object is a method of operating a center pivot irrigation system of the above type in which the extension is very accurately controlled and in a very simple manner.

Another object is a system of the above type which greatly reduces crop knockdown.

Another object is an extension for a center pivot irrigation system which may either trail or lead the main pipeline.

Another object is a center pivot irrigation system with an extension on the end thereof for irrigating the corners and a method of operating it in which the main pipeline is stationary and inoperative while the extension is pivoting and watering a corner and when the main pipeline is moving and irrigating, the extension is folded in and is inoperative.

Another object is a system of the above type and a method of operating it in which the extension has indexable wheels, which are in a trailing position when the main pipeline is stationary and are indexed 90° and rotated through the corner when the main pipeline is stationary opposite a corner.

Other objects will appear from time to time in the ensuing specification and drawings.

BRIEF DESCRIPTION OF THE DRAWINGS

FIG. 1 is a diagrammatic illustration of a typical center pivot irrigation system with a corner watering mechanism diagrammatically indicated thereon;

FIG. 2 is a diagrammatic illustration, on an enlarged scale, of a number of operative positions of the mechanism of FIG. 1;

FIG. 3 is a varition similar to FIG. 1;

DESCRIPTION OF THE PREFERRED EMBODIMENTS

Figure 4:
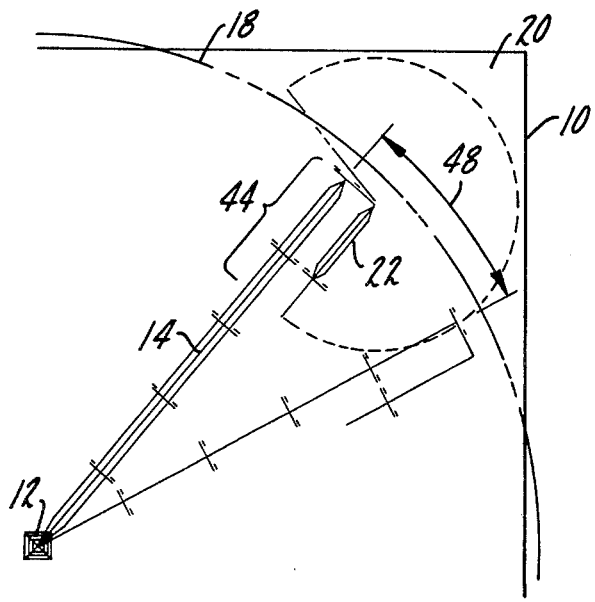
FIG. 4 illustrates a certain type of operation.

FIG. 1 is a diagrammatic plan view of a typical center pivot irrigation system in which a field, indicated generally at 10, of any suitable size has a center pivot at 12 disposed generally in the center thereof with a suitable pipeline extending outwardly therefrom, as at 14, supported at intervals by movable wheeled tower 16, each of which may be self-propelled or otherwise so that a generally circular area 18 is irrigated by the system. A circular system of this nature cannot irrigate the corners 20 which amount to a substantial loss in acreage, something on the order of 20 percent of the total.

To irrigate the corners, an extension 22 is connected to the outermost tower 24 by an offset 26. Preferably the extension 22 is pivoted to the offset, as at 28, and has its own wheeled tower 30 in which the wheels are on fixed axis which may be considered to be generally parallel to the alignment of the extension. The tower 30 for the extension also is aligned with the next to last tower 32 on the main pipeline so that the wheels of towers 30 and 32 will move in the same ruts, thereby eliminating or reducing crop-knockdown.

The main pipeline 14 may be considered to have sprinkler units at intervals throughout its length which may be conventional and are not shown. The extension also has sprinkler units and they may be controlled separately from those on the main pipeline so that they operate separately. The control of the sprinklers may be, for example, by solenoid valves.

As shown in FIG. 2, the unit operates as follows. It may be assumed that the main pipeline 14 is turning clockwise and that the wheels of the next to last tower 32 on the main pipeline are circumferentially aligned with the wheels on the extension tower 30 so that they run in the same circle. In the position shown at 34 it will be noted that the extension is folded in and moves ahead of the main pipeline. In this position the sprinkler units on the main pipeline are operating while those on the extension are not. The main pipeline is turning clockwise and the extension moves ahead of it and is totally deenergized so that it is merely going along for the ride.

In the next position, indicated generally at 36, the main pipeline has arrived at a position more or less opposite a corner 20. At a suitable point, movement of the main pipeline may be stopped. For example, a post may be set in the ground which will trip a wire or hit an abutment at or toward the outer end of the main pipeline which will cause it to stop its rotation. At or about the same time, the extension 22 starts a counterclockwise rotation about its offset pivot 28, moving some 270° to the position 38 where it reverses and comes back to the folded-in position. During this some 270° of rotation and counterrotation, its sprinkler units on the sprinkler will be working while those on the main pipeline will not. The sprinkler units on the extension may operate during the entire 270° of its movement, or they can be shut down during the first 90°, until it reaches the position 40, at which point they could come on and cover the outer 180°, which is basically the noncircular area in the corner since the first 90° will be irrigated by the main pipeline when its movement resumes.

When the extension gets back to its fully folded-in position, an automatic control can shut down the sprinkler units on the extension and, at the same time, start rotation of the main pipeline system and energize its sprinkler units so that it moves on, as shown by position 42. It will be noted that during the some 270° of movement of the extension its wheels move about a fixed pivot, referring to 28, so that they do not have to be steered or indexed. It will also be noted that its wheels about the center 12 of the main pipeline system, when the extension is folded in and inoperative and is moving with the main pipeline system, as at position 34. So at no time do the wheels of the extension tower 30 have to be guided or steered or required to follow a complex path of movement.

In FIGS. 1 and 2 it will be noted that the extension is pivoted at an offset position on the outermost tower forward of the direction of movement of the main pipeline system so that, in its folded-in position, the extension leads. But it could follow or lag, such as shown in FIG. 3, and the relationship would be the same, namely the main pipeline system would stop opposite a corner and the extension would be energized, both its drive and its sprinklers, so that it would pivot through some 270° and back, thereby irrigating the corner and then remain in the folded-in position until it arrives at the next corner. In either situation the sprinkling rate of the extension would be set for two passes so that on each pass it would have a rate approximately one-half of that required, which is in contrast to the sprinkling rate of the main pipeline, although it might be otherwise. And as with the FIG. 1 form, while the main pipeline is stationary and the extension is rotating through it some 270°, the sprinkler units on the main pipeline will probably be deenergized.

Figure 5:
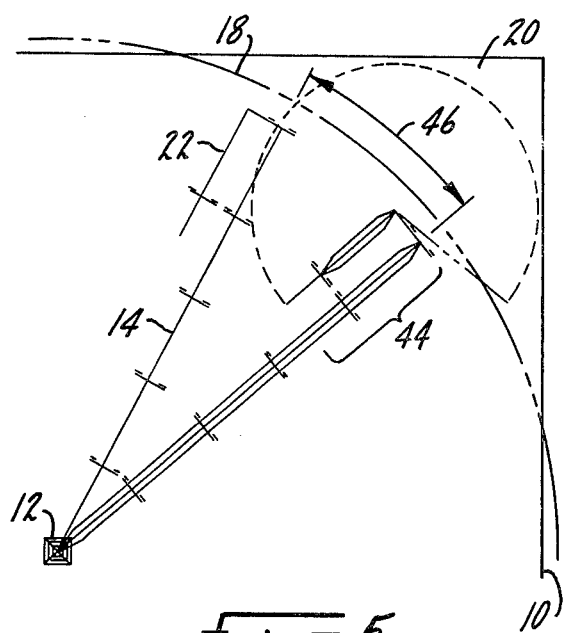
FIG. 5 illustrates another type of operation.

In FIG. 5, a highly desirable method of operation of the FIG. 3 form is to shut off the sprinklers on the last span and a half of the main pipeline system adjacent the outer end, for example at 44, for a certain distance 46, say, the last 100–150 ft. before the main pipeline came to a stop. Then when the extension starts its pivoting movement and is sprinkling during the first 90° of rotation, it would be irrigating a portion of the main circle that had not been irrigated by the main pipeline which would prevent overirrigation.

In the folded-in arrangement where the extension is leading, such as shown in FIG. 4, instead of shutting off the last span and a half 44 before coming to a stop, it might be desirable to wait and shut off the last span and a half after the corner has been irrigated. The extension will be folded back in. And the main pipeline will start up and move for a certain distance 48, say, the first 100–150 ft., before the sprinklers in length 44 come on. Thus the 90° area in the main circle covered by the extension swinging out and returning from the corner would not be overirrigated.

Figure 6:
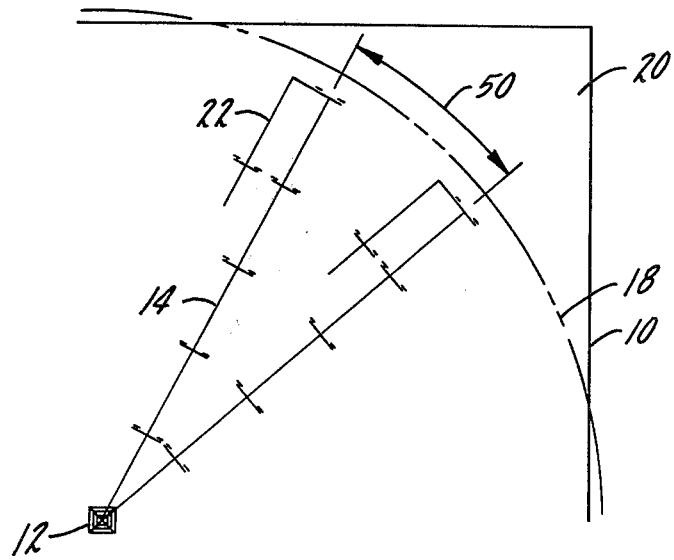
FIG. 6 illustrates another type of operation.

Another method of operation, as shown in FIG. 6, would be to speed up the rate of movement of the main pipeline for a certain distance 50, say the last 50 ft. before it comes to a stop so as to underirrigate a certain section. Then the extension would dry cycle during the first 90° of its movement, the portion inside of the main circle, so that only the 180° in the corner is sprinkled by the extension. The sprinklers on the main pipeline would continue to operate until the extension gets out into the 180° where it is irrigating the corner. As before, the object is to avoid overirrigating any particular part or parts of the field which is not to say that one part will get more water than another. But the object is to keep the situation in balance even though there is some variation.

In certain circumstances it may be necessary and/or desirable to index either one or both of the wheels on the extension tower a little to counteract, reduce or eliminate any longitudinal thrust that might otherwise result. For example, the wheels of the extension tower 30 might be indexed a few degrees in the FIG. 1 or FIG. 3 position so that one or both are on an arc described more or less about the center 12. When the unit is in the FIG. 2 or 5 position, one or both wheels on the extension tower 30 might be indexed a few degrees the other way so that they are on an arc described generally about pivot point 28.

Figure 7:
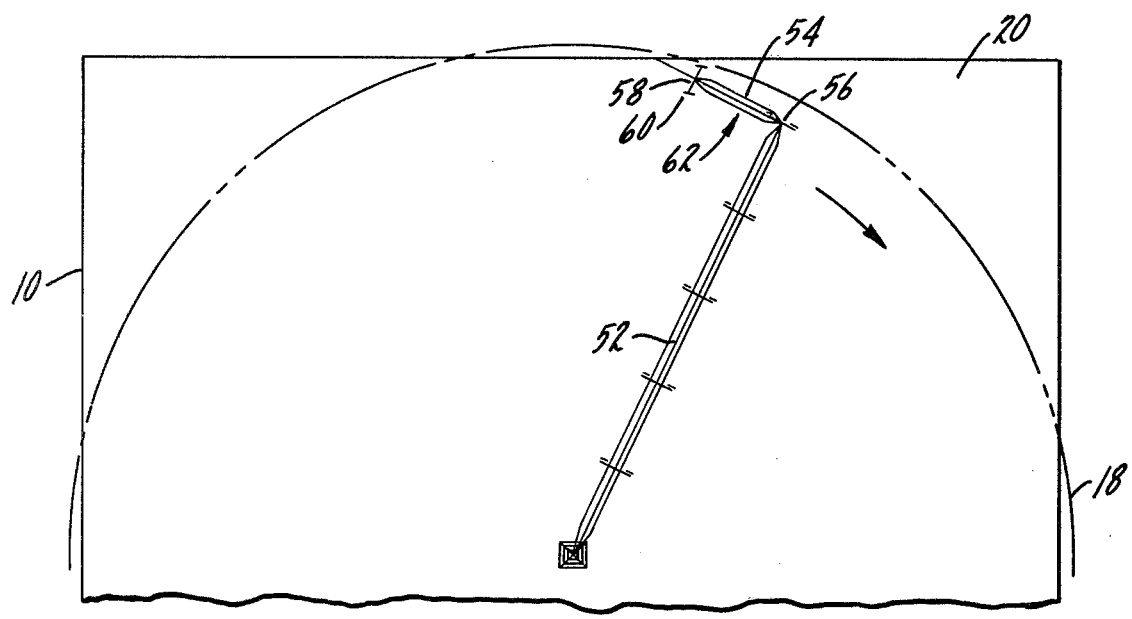
FIG. 7 is a further variant form.
Figure 8:
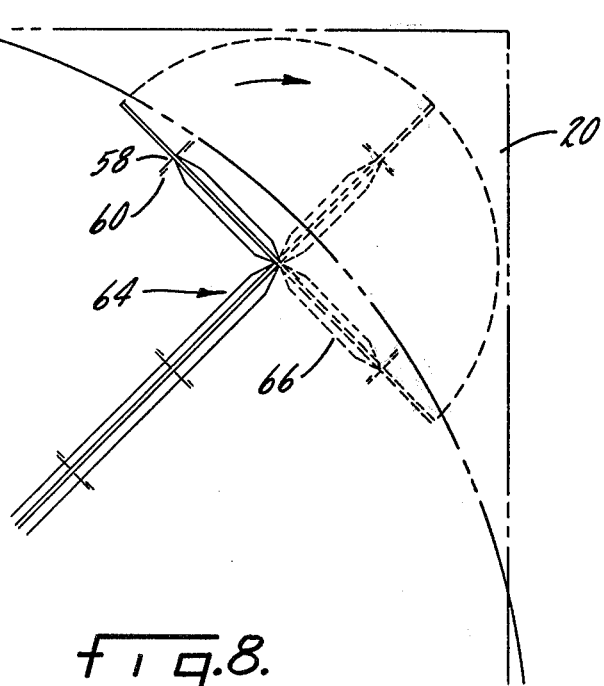
FIG. 8 is an enlargement of a number of operative positions of the FIG. 7 mechanism.

In FIG. 7 a variation has been shown in which the main pipeline 52 has an extension 54 pivoted to the outer end thereof, as at 56, with the extension having a wheeled tower 58 on which each of the wheels 60 are indexable 90° more or less. As shown in the position 62, the extension follows or trails behind the main pipeline which may be assumed to be rotating clockwise and the wheels are positioned to trail. In this position, the sprinkler units on the main pipeline will be operating and sprinkler units on the extension will be inoperative. When the main pipeline arrives at a position opposite, say, a corner, generally as indicated at 64 in FIG. 8, it will be deenergized, for example like contacting a post or other sensing device. At or about the same time, the wheels 60 on the tower will be indexed about 90° to a rotating position, such as shown in FIG. 8, the sprinklers on the extension will come on and those on the main pipeline will go off, and the extension will be moved clockwise through about 180° to position 66, then will reverse until it comes back to the trailing position, thereby making two passes across a substantial part of the corner area with its sprinklers operating. When the extension gets back to its trailing position, the wheels will be indexed again about 90°, at which time movement of the main pipeline will start again with the sprinklers on the main pipeline being energized and those on the extension being deenergized. It will be understood that while the extension is moving through its 180° and back, its watering rate should be set for two passes.

In the form shown in FIG. 8 the extension should trail behind the main pipe system so that it can be towed. Also, while one wheeled tower has been shown on the extension of the form in FIG. 1 as well as the form in FIG. 7, it should be understood that the extension may cover more or less than one and a half spans, for example, two and a half spans, in which case more than one tower may be used. If two towers are used in FIG. 7, the wheels on each would be indexable through 90°. If one or more towers are used in the form of FIG. 1, they should line up with the towers on the main pipeline so that extra ruts are not creating to cause additional crop knockdown.

In both of the embodiments, it has been stated that the extension pivots to irrigate the corner when the main piepline is opposite a corner. And this should be interpreted as a generalization. It is important that the main pipeline, however, be stationary and its sprinkler units inactive, or substantially so, while the extension, with the sprinklers active, is irrigating the corner. Also, while there may be some overlapping between the part of the field that the extension irrigates and the part that the main pipeline irrigates in the form of FIG. 1, this can be suitably controlled or held to a minimum or the water rates set accordingly. The mechanism, be it electric, hydraulic or otherwise, for turning the various sprinkler units off and on and for stopping and starting both the main pipeline and the extension may be conventional and is not shown herein in detail, which would be unnecessary.

As another example, it is entirely feasible to have the extension pivot close to 360°, for example 355°, so that it would move all the way from a leading to a lagging position and back. In that case the pivot might have to be elevated so that the extension would clear the last tower and the extension would not necessarily be offset. In such an arrangement the wheels on the extension tower might have to be indexed 5° or 10°, or some such, to prevent them from causing an excessive outthrust on the main pipeline when the extension was folded in and the entire center pivot was operating away from a corner.

Also, while the units have been referred to as wheeled towers, stepping units are also well known and one or more of the inventive concepts herein could readily be applied to towers that use mobility units other than wheels. For example, a tractor thread. So the term wheeled towers both in the specification and claims, is intended as a generic term in this regard and should be interpreted as describing and covering equivalent devices.

Whereas the preferred form and several variations of the invention have been shown and suggested and described, it should be understood that suitable additional modifications, changes, substitutions and alterations may be made without departing from the invention's fundamental theme.

The embodiments of the invention in which an exclusive property or privilege is claimed are defined as follows:

1. A method of operating a center pivot irrigation system to irrigate a field which has one or more noncircular areas, the system including a main irrigation pipe system with sprinkler units thereon supported at intervals on wheeled towers and arranged to pivot about a center and a wheeled extension with sprinkler units thereon pivotal adjacent the end of the main pipe system, including the steps of simultaneously pivoting and sprinkling with the main pipe system through a generally circular part of the field to be irrigated and, at the same time, positioning the extension within the circular area and with its sprinkler units deenergized, stopping the main pipe system opposite a noncircular area to be irrigated outside of the circular area of the field and deenergizing its sprinkler units, pivoting the extension about the now stationary outer end of the main pipe system through an arc that extends outside of the circular area into the noncircular area and operating the sprinkler units on the extension so as to irrigate the noncircular area while holding the main pipe system stationary and its sprinkler units deenergized, pivoting the extension back to a position within the circular area and stopping its pivoting motion and deenergizing its sprinkling units, thereafter moving the main pipe system again and energizing its sprinkler units with the extension and its sprinkler units deenergized until the system is again opposite a noncircular area to be irrigated where the cycle is repeated.

2. The method of claim 1 further characterized in that the extension is supported on wheels which are indexable between a pivoting position and a towing position and the main pipe system is pivoted with the extension positioned in a trailing position disposed generally tangent to the area of the outer end of the main pipe section with the extension wheels in a towing position and its sprinkler units deenergized, and further including the step of indexing the wheels on the extension through approximately 90° to its pivoting position when the main pipe system stops opposite a noncircular area and, after pivoting of the extension to irrigate the noncircular area, returning the extension generally to its original trailing position and indexing its wheels back to their towing position so that when the main pipe system moves again, the extension will trail behind.

3. The method of claim 1 further characterized in that the wheels on the extension are on fixed axes and further characterized by and including the steps of positioning the extension inwardly in a folded-in position generally toward the center pivot and generally parallel to the main pipe system during pivoting movement of the main pipe system and with the sprinkler units on the extension deenergized so that the wheels of the extension are moving in an arc generally concentric with the center pivot, and the step of returning the extension to a position within the generally circular area of the field includes pivoting the extension inwardly to a folded-in position directed generally toward the center pivot and generally parallel to the main pipe system.

4. The method of claim 3 in which the folded-in position of the extension in behind the main pipeline system relative to the direction of rotation of the main pipeline system, and further including the step of deenergizing the sprinkler units on the outer end of the main pipeline system for a distance generally coextensive with the extension for the last portion of movement of the main pipeline system before it stops opposite a noncircular area and the extension starts pivoting so that the area within the generally circular part of the field thereafter traversed by the extension will not be overirrigated.

5. The method of claim 3 in which the folded-in position of the extension is ahead of the main pipeline system relative to the direction of rotation of the main pipeline system, and further including the step of deenergizing the sprinkler units on the outer end of the main pipeline system for a distance generally coextensive with the extension for the first portion of movement of the main pipeline system after it starts pivoting again so that the area within the generally circular part of the field theretofore traversed by the extension will not be overirrigated.

6. The method of claim 3 further characterized by and including the steps of increasing the rate of movement of the main pipeline system for a certain distance before stopping it opposite and noncircular area, thereafter keeping the sprinkler units on the main pipeline system energized and the sprinkler units on the extension deenergized during approximately the first 90° of movement of the extension until it reaches the noncircular area, and then energizing the sprinkler units on the extension and deenergizing the sprinkler units on the main pipeline system.

7. A method of operating a center pivot irrigation system to irrigate a field which has one or more noncircular areas, the system including a main irrigation pipe system with sprinkler units thereon supported at intervals on wheeled towers and arranged to pivot about a center and an extension with sprinkler units thereon pivotal adjacent the end of the main pipe system supported on wheels which are indexable between a pivoting position and a towing position, including the steps of simultaneously pivoting and sprinkling with the main pipe system through a generally circular part of the field to be irrigated and, at the same time, positioning the extension within the circular area in a trailing position disposed generally tangent to the arc of the outer end of the main pipe system with its wheels in their towing position and its sprinkling units deenergized, stopping the main pipe system opposite a noncircular area to be irrigated outside of the circular area of the field and deenergizing the sprinkler units on the main pipe system, indexing the wheels on the extension through approximately 90° to their pivoting position, pivoting the extension about the now stationary outer end of the main pipe system through an arc that extends outside of the circular area into the noncircular area and operating the sprinkler units of the extension so as to irrigate the noncircular area while holding the main pipe system stationary and its sprinkler units deenergized, returning the extension generally to its original trailing position, deenergizing the sprinkler units on the extension and indexing its wheels approximately 90° to their towing position, and thereafter moving the main pipe system again and energizing the sprinkler units on the main pipe system with the extension trailing behind and the sprinkler units on the extension deenergized until the system is again opposite a noncircular area to be irrigated where the cycle is repeated.

8. A method of operating a center pivot irrigation system to irrigate a field which has one or more noncircular areas, the system including a main irrigation pipe system with sprinkler unts thereon supported at intervals on wheeled towers and arranged to pivot about a center and a wheeled extension with sprinkler units thereon pivotal adjacent the end of the main pipe system, including the steps of simultaneously pivoting and sprinkling with the main pipe system through a circular part of the field to be irrigated and, at the same time, positioning the extension inwardly in a folded-in position directed generally toward the center pivot and generally parallel to the main pipe system so that the wheels on the extension will be moving in an arc generally concentric with the center pivot and with the sprinkling units on the extension deenergized, stopping the pivoting movement of the main pipe system opposite a noncircular area to be irrigated outside of the circular area of the field and deenergizing the sprinkling units on the main pipe system, independently pivoting the wheeled extension about the now stationary outer end of the main pipe system through an arc that extends outside of the circular area into the noncircular area and operating the sprinkling units on the extension so as to irrigate at least a substantial part of the noncircular area while holding the main pipe system stationary with the sprinkling units on the main pipe system deenergized, returning the extension to an inward folded-in position directed generally toward the center pivot and disposed generally parallel to the main pipe system and deenergizing the sprinkling units on the extension, and thereafter pivoting the main pipe system again and energizing the sprinkling units on the main pipe system while maintaining the extension in its folded-in position with its sprinkling units deenergized until the system again is opposite a noncircular area to be irrigated where the cycle is repeated.

9. The method of claim 8 in which the extension is pivoted outwardly through approximately 270° and then is pivoted back to its original folded-in position before the main pipe system starts pivoting again.

10. The method of claim 8 in which the extension starts pivoting at the same time that the main pipe system stops pivoting and vice versa.

11. The method of claim 8 in which the folded-in position of the extension is ahead of the main pipe system relative to the direction of rotation of the main pipe system.

12. The method of claim 11 further characterized by and including the step of deenergizing the sprinkler units on the outer end of the main pipeline system for a distance generally coextensive with the extension for the first portion of movement of the main pipeline system after it starts pivoting again so that the area within the generally circular part of the field thereafter traversed by the extension will not be overirrigated.

13. The method of claim 11 further characterized by and including the steps of increasing the rate of movement of the main pipeline system for a certain distance before stopping it opposite a noncircular area, thereafter keeping the sprinkler units on the main pipeline system energized and the sprinkler units on the extension deenergized during approximately the first 90° of movement of the extension until it reaches the noncircular area, and then energizing the sprinkler units on the extension and deenergizing the sprinkler units on the main pipeline system.

14. The method of claim 8 in which the folded-in position of the extension is behind the main pipe system relative to the direction of rotation of the main pipe system.

15. The method of claim 14 further characterized by and including the step of deenergizing the sprinkler units on the end of the main pipeline system for a distance generally coextensive with the extension for the last portion of movement of the main pipeline system before it stops opposite a noncircular area and the extension starts pivoting so that the area within the generally circular part of the field thereafter traversed by the extension will not be overirrigated.

16. The method of claim 14 further characterized by and including the steps of increasing the rate of movement of the main pipeline system for a certain distance before stopping it opposite a noncircular area, thereafter keeping the sprinkler units on the main pipeline system energized and the sprinkler units on the extension deenergized during approximately the first 90° of movement of the extension until it reaches the noncircular area, and then energizing the sprinkler units on the extension and deenergizing the sprinkler units on the main pipeline system.

17. The method of claim 8 in which the extension is pivoted through approximately 360° and is stopped on the other side of the main pipe system so that the extension leads the main pipe system during one step of the cycle and follows it during the next.

18. The method of claim 8 in which the extension is pivoted to the main pipe system in a position offset somewhat to the direct alignment of the main pipe system.

19. The method of claim 18 further characterized in that the extension is offset forwardly of the main pipe system relative to the direction of rotation of the main pipe system.

20. The method of claim 18 further characterized in that the extension is offset rearwardly of the main pipe system relative to the direction of rotation of the main pipe system.

21. In a center pivot irrigation system for irrigating a field which has one or more noncircular areas, a main irrigation pipe system with sprinkler units thereon supported at intervals on wheeled towers and arranged to pivot about a center pivot, an extension with sprinkler units thereon pivoted adjacent the end of the main sprinkler system and supported on wheels, means for pivoting and sprinkling with the main pipe system through a generally circular part of the field to be irrigated, means for positioning the extension within the circular area during such pivoting and sprinkling of the main pipe system, means for stopping the main pipe system opposite a noncircular area to be irrigated outside of the circular area of the field and deenergizing its sprinkler units, means for pivoting the extension about the now stationary outer end of the main pipe system through an arc that extends outside of the circular area into the noncircular area and operating the sprinkler units on the extension so as to irrigate the noncircular area while the main pipe system is stationary and its sprinkler units are deenergized, means for returning the extension to a position inside of the circular area and deenergizing the sprinkler units on the extension, and means for pivoting the main pipe system again and energizing its sprinkler unit with the extension and its sprinkler units deenergized until the system is again opposite a noncircular area.

22. The structure of claim 21 further characterized in that the wheels on the extension are indexable between a pivoting position and a towing position and further characterized by and including means for indexing such wheels so that they are in a towing position when the main pipe system is pivoting and are in a pivoting position when the extension is pivoting, and means for maintaining the extension in a trailing position when the main pipe system is pivoting and for pivoting the extension through the noncircular area of the field and back to the trailing position when the main pipe system is stationary and for indexing the wheels to a trailing position when the main pipe system starts its pivoting movement again.

23. The structure of claim 21 further characterized in that the wheels on the extension are positioned on fixed axes and further including means for positioning the extension in a folded-in position during the pivoting movement of the main pipe system so that the extension is directed generally inwardly toward the center pivot and is disposed generally parallel to the main pipe system so that the wheels on the extension are moving in an arc generally concentric with the center pivot during pivoting movement of the main pipe system, and means for pivoting the extension through generally 270° when the main pipe system stops and for bringing it back to its folded-in position and means for energizing the sprinklers on the extension during such 270° of movement to irrigate the noncircular area.

24. In a center pivot irrigation system constructed to irrigate a field which has one or more noncircular areas, a main irrigation pipe system with sprinkler units thereon supported at intervals on wheeled towers and arranged to pivot about a center, a wheeled extension with sprinkler units thereon pivotal adjacent the end of the main pipe system, means for simultaneously pivoting and sprinkling with the main pipe system through a circular part of the field to be irrigated, means for positioning the extension inwardly in a folded-in position directed generally toward the center pivot and generally parallel to the main pipe system with its sprinkler units inoperative so that the wheels on the extension are moving in an arc generally concentric with the center pivot, means for stopping the main pipe system opposite a noncircular area to be irrigated outside of the circular area of the field and for deenergizing its sprinkler units, means for independently pivoting the wheeled extension about the now stationary outer end of the main pipe system through an arc that extends outside of the circular area into the noncircular area and for operating its sprinkler units so as to irrigate the noncircular area while the main pipe system is stationary and its sprinkler units are deenergized, means for returning the extension to an inwardly folded-in position directed generally toward the center pivot generally parallel to the main pipe system and for deenergising its sprinkler system, and means for moving the main pipe system again and energizing its sprinkler units while maintaining the extension in its folded-in position with its sprinkler units deenergized during such movement of the main pipe system until the system is again opposite a noncircular area to be irrigated.

25. The structure of claim 24 further characterized in that the extension is constructed and arranged to pivot outwardly through approximately 270° and then pivot back to its original folded-in position before the main unit starts again.

26. The structure of claim 24 further characterized in that the extension is constructed and arranged to start pivoting at the same time that the main system stops.

27. The structure of claim 24 further characterized in that the folded-in position of the extension is ahead of the main pipe system.

28. The structure of claim 24 further characterized in that the folded-in position of the extension is behind the main pipe system.

29. The structure of claim 24 further characterized in that the extension is constructed and arranged to pivot through approximately 360° and to stop on either side of the main pipe system so that it may either lead or follow the main pipe system.

30. The structure of claim 24 further characterized in that the pivot between the extension and the main pipe system is offset at the end of the main pipe system.

31. The structure of claim 30 further characterized in that the offset is forward relative to the direction of movement of the main pipe system.

32. The structure of claim 30 further characterized in that the extension is offset rearwardly relative to the direction of movement of the main pipe system.

* * * * *